United States Patent
Wood et al.

(10) Patent No.: US 10,753,615 B2
(45) Date of Patent: Aug. 25, 2020

(54) DUAL FUEL CONCENTRIC NOZZLE FOR A GAS TURBINE

(71) Applicant: ANSALDO ENERGIA SWITZERLAND AG, Baden (CH)

(72) Inventors: John Philip Wood, Rüthihof (CH); Andrea Ciani, Zürich (CH); Adnan Eroglu, Untersiggenthal (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 278 days.

(21) Appl. No.: 15/725,770

(22) Filed: Oct. 5, 2017

(65) Prior Publication Data

US 2018/0100653 A1    Apr. 12, 2018

(30) Foreign Application Priority Data

Oct. 8, 2016  (EP) ..................................... 16192964

(51) Int. Cl.
*F23R 3/36* (2006.01)
*F23R 3/28* (2006.01)
(Continued)

(52) U.S. Cl.
CPC ................ *F23R 3/36* (2013.01); *F23R 3/286* (2013.01); *F02C 3/04* (2013.01); *F02C 7/222* (2013.01);
(Continued)

(58) Field of Classification Search
CPC .... F23C 1/08; F23R 2900/03341; F23R 3/36; F23R 3/346; F23D 17/002
See application file for complete search history.

(56) References Cited

U.S. PATENT DOCUMENTS 4,098,255 A * 7/1978 Nowak ................... F23C 3/002
                                                    126/91 A
4,589,260 A * 5/1986 Krockow .............. F23D 11/005
                                                    60/737
(Continued)

FOREIGN PATENT DOCUMENTS

CN          103776059 A     5/2014
CN          105627364 A     6/2016
(Continued)

OTHER PUBLICATIONS

Extended European Search Report dated Apr. 11, 2017, issued by the European Patent Office in the corresponding European Patent Application No. 16192964.1-1602. (9 pages).
(Continued)

*Primary Examiner* — Gerald L Sung
(74) *Attorney, Agent, or Firm* — Buchanan Ingersoll & Rooney PC (57) ABSTRACT

A dual fuel concentric nozzle such as for a dual fuel injector of a sequential burner of a sequential gas turbine, the dual fuel concentric nozzle having a nozzle downstream end, a liquid fuel duct, a gas fuel duct concentrically surrounding the liquid fuel duct and defining a gas fuel passage between the outer surface of the liquid fuel duct and the inner surface of the gas fuel duct, and a lateral surface concentrically surrounding the gas fuel duct and defining a carrier air passage, a downstream end edge of the gas fuel duct being recessed inside the nozzle downstream end with respect to a downstream end edge of the liquid fuel duct.

19 Claims, 4 Drawing Sheets

(51) Int. Cl.
*F02C 3/04* (2006.01)
*F02C 7/22* (2006.01)

(52) U.S. Cl.
CPC . *F23N 2235/26* (2020.01); *F23R 2900/03341* (2013.01)

(56) References Cited

U.S. PATENT DOCUMENTS

| | | | |
|---|---|---|---|
| 5,062,792 A * | 11/1991 | Maghon | F23C 7/004 431/284 |
| 5,431,018 A | 7/1995 | Keller | |
| 2005/0086944 A1* | 4/2005 | Cowan | F23D 17/002 60/776 |
| 2009/0044539 A1 | 2/2009 | Eroglu et al. | |
| 2010/0300109 A1* | 12/2010 | Carroni | F23L 7/00 60/776 |
| 2012/0291444 A1* | 11/2012 | Oskam | F23R 3/28 60/772 |
| 2014/0123665 A1* | 5/2014 | Wood | F23R 3/346 60/774 |
| 2015/0047365 A1 | 2/2015 | Duesing | |
| 2016/0146466 A1 | 5/2016 | Yang et al. | |
| 2016/0146468 A1 | 5/2016 | Gao et al. | |

FOREIGN PATENT DOCUMENTS

| | | |
|---|---|---|
| EP | 0 577 862 A1 | 1/1994 |
| EP | 2 837 888 A1 | 2/2015 |
| EP | 3 023 697 A1 | 5/2016 |

OTHER PUBLICATIONS

Office Action for Chinese Patent Application No. 201710907463 dated Apr. 3, 2020.
Office Action for Chinese Patent Application No. 201710907463 dated Apr. 3, 2020 (English Translation).

* cited by examiner

DUAL FUEL CONCENTRIC NOZZLE FOR A GAS TURBINE

PRIORITY CLAIM

This application claims priority from European Patent Application No. 16192964.1 filed on Oct. 8, 2016, the disclosure of which is incorporated by reference.

FIELD OF THE INVENTION

The present invention relates to a dual fuel concentric nozzle for a gas turbine.

In particular, the present invention relates to a dual fuel concentric nozzle for a dual fuel injector of a sequential burner of a gas turbine.

Moreover, the present application refers to a gas turbine, in particular a sequential gas turbine, comprising a dual fuel injector provided with a plurality of such dual fuel concentric nozzles.

DESCRIPTION OF PRIOR ART

As known, a gas turbine power plant (in the following only gas turbine) comprises a rotor provided with an upstream compressor, at least a combustion chamber and at least a downstream turbine. The terms "downstream" and "upstream" refer to the direction of the main gas flow passing through the gas turbine from the compressor to the turbine. In particular, the compressor comprises an inlet supplied with air and a plurality of blades and vanes configured for compressing the air entering the compressor. The compressed air leaving the compressor flows into a plenum and from there into a burner. Inside the burner, the compressed air is mixed with at least one fuel. The mixture of such fuel and the compressed air flows into a combustion chamber where this mixture is combusted. The resulting hot gas leaves the combustor chamber and expands in the turbine performing work on the rotor.

In order to achieve a high efficiency, a high turbine inlet temperature is required. However, due to this high temperature, high NOx emission levels are generated.

In order to reduce these emissions and to increase operational flexibility, today is known a particular kind of gas turbines called "sequential" gas turbine.

In general, a sequential gas turbine comprises two combustion chambers in series. According to a first kind of sequential gas turbines, the two combustion chambers are physically separated by a stage of turbine blades, called high pressure turbine.

Following the main gas flow, this first kind of sequential gas turbines comprises a compressor, a first combustion chamber (usually having an annular shape), a high-pressure turbine, a second combustion chamber (usually having an annular shape) and a low-pressure turbine. The compressor and the two turbines are connected to a common rotor rotating around an axis and surrounded by a concentric casing. The compressor is supplied with air and compresses it. The compressed air flows into a plenum and from there into a premix burner where this compressed air is mixed with at least one fuel introduced via a fuel supply. The fuel/compressed air mixture flows into the first combustion chamber where this mixture is combusted.

The resulting hot gas leaves the first combustor chamber and is partially expanded in the high-pressure turbine performing work on the rotor.

Downstream of the high-pressure turbine the gas partially expanded flows into the second combustion chamber.

The partially expanded gas has a high temperature and contains sufficient oxygen for a further combustion that, based on a self-ignition, takes place in the second combustion chamber. The reheated gas leaves the second combustion chamber and flows in the low-pressure turbine where is expanded performing work on the rotor.

In the foregoing mentioned second combustion chamber fuel is injected along the hot gas flow through particular injectors connected to fuel lances.

Each of the above mentioned particular injectors comprises a streamline body with a leading edge, a trailing edge and, often, vortex generators attached to the lateral walls of the streamlined body. In the streamline body, the injector comprises separated ducts supplied respectively with gas fuel, liquid fuel, for instance oil, and carrier air. In particular, the above ducts are arranged each other to realize a dual fuel concentric nozzle wherein the oil duct is placed in the middle, the gas fuel is placed surrounding the oil fuel duct whereas the carrier air duct is placed surrounding the gas fuel duct. The dual fuel feeding of liquid fuel and gas fuel allows the gas turbine to have a high efficiency in a wide range conditions.

An example of a sequential gas turbine provided with a high pressure turbine and a plurality of dual fuel concentric injectors as foregoing described is disclosed in EP3023697.

Today is known a second kind of sequential gas turbines not provided with the high pressure turbine. According to this kind of gas turbine, the two combustion chambers are integrated in a single casing, for instance can-shaped. Of course, this kind of gas turbine is provided with a plurality of can combustors arranged as a ring around the turbine axis. Also the second combustion chamber of the above sequential gas turbine can be provided with a plurality of the foregoing described dual fuel concentric nozzles.

An example of a sequential gas turbine provided and a plurality of dual fuel concentric nozzles, and wherein the two combustion chambers are integrated in a single casing, is described in EP2837888.

Figure 1:
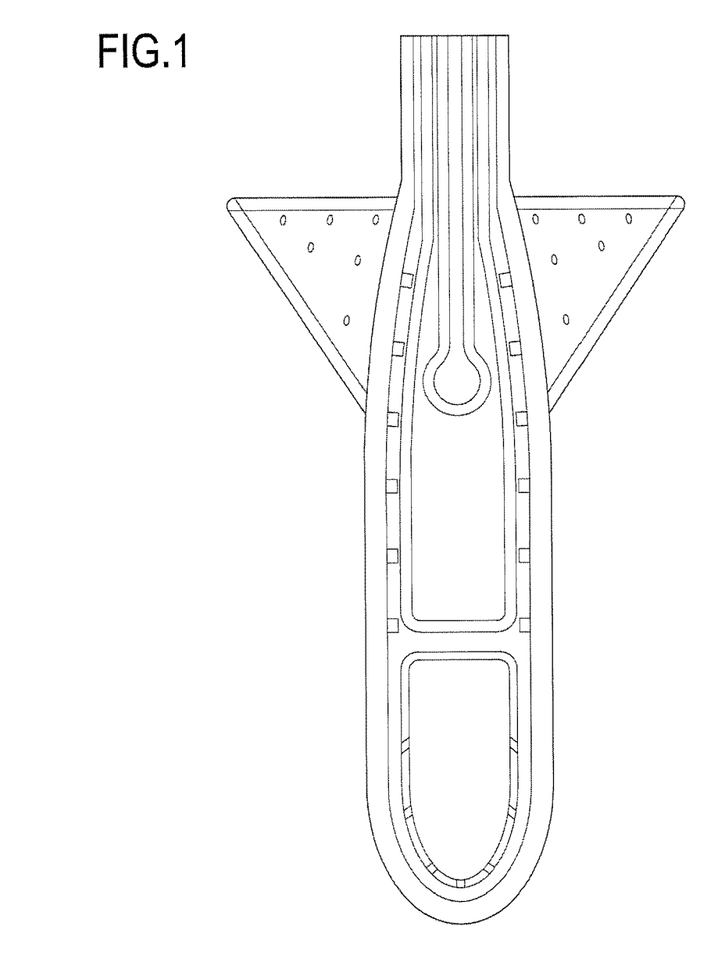
FIG. 1 is a schematic sectional view of a portion of a dual fuel injector for a sequential combustor of a gas turbine, wherein such dual fuel injector is provided with a concentric nozzle according to the prior art.

According to the prior art practice, the duct of the liquid fuel, the duct of the gas fuel and the lateral walls delimiting the carrier air passage comprise walls extending up to the trailing edge of the streamline body of the each dual fuel injector. In other words, according to the prior art practice the downstream end edge of the separating walls of the concentric ducts are arranged at the same plane. FIG. 1 is a schematic sectional view of a dual fuel concentric nozzle according to the prior art as foregoing described.

Unfortunately, during the liquid fuel operation of the gas turbine, wherein there is no flow through the gas duct, emulsion enters the gas duct reducing consequently the lifetime of the injector.

According to the prior art, today the solution of the above technical problem consists in continuous purging the fuel gas duct with air during the liquid fuel operation. However, this solution requires an additional interconnection between the fuel gas duct and a cooling air circuit.

SUMMARY OF THE INVENTION

Accordingly, a primary object of the present invention is to provide an alternative dual fuel concentric nozzle for a gas turbine, in particular for a sequential burner of a gas turbine, that allows to overcome the foregoing described problem of the prior art.

In order to achieve the objective mentioned above, the present invention provides a dual fuel concentric nozzle for a gas turbine, in particular for a dual fuel injector of a sequential burner of a gas turbine. The dual fuel concentric nozzle comprises:

- a nozzle downstream end configured to inject gas fuel, liquid fuel and carrier air along a hot gas main flow;
- a liquid fuel duct defining a liquid fuel passage for connecting a liquid fuel supply to the nozzle downstream end, the liquid fuel duct comprising a downstream end edge at the nozzle downstream end;
- a gas fuel duct concentrically surrounding the liquid fuel duct and defining a gas fuel passage between the outer surface of the liquid fuel duct and the inner surface of the gas fuel duct for connecting a gas plenum to the nozzle downstream end, the gas fuel duct comprising a downstream end edge at the nozzle downstream end;
- a lateral wall concentrically surrounding the gas fuel duct and defining a carrier air passage between the outer surface of the gas fuel duct and the inner surface of the lateral wall for connecting an air plenum to the nozzle downstream end, the lateral wall comprising a downstream end edge at the nozzle downstream end.

According to a first aspect of the invention, the downstream end edge of the gas fuel duct is recessed inside the nozzle downstream end with respect to the downstream end edge of the liquid fuel duct.

Advantageously, during the liquid (oil) fuel operation the above configuration allows to realize an aerodynamic blocking effect performed by the carrier air configured for avoiding any emulsion penetration inside the gas fuel duct. Indeed, the recessed downstream end edge of the gas fuel duct allows the generation in the recessed portion of aerodynamic vortexes that fluidly close the gas fuel passage.

In particular, the downstream end edge of the gas fuel duct is recessed inside the nozzle downstream end with respect to the downstream end edge of the lateral wall. Preferably, the downstream end edge of the liquid fuel duct is flush with the downstream end edge of the lateral wall.

Advantageously, according to the above solution during the gas fuel operation the above configuration allows to realize a useful aerodynamic shielding effect for the fuel gas leaving the nozzle with respect to hot gas main flow. Indeed, the shielding effect generated by the carrier air remains effective since the two co-flowing jets (fuel gas and air) are not strongly mixing until the nozzle exit.

Of course, a particular geometrical disposition of the gas and liquid fuel ducts has an important influence on the required result of the invention. Preferably:

- the recession distance R between the downstream end edge of the gas fuel duct and the downstream end edge of the liquid fuel duct is preferably more than the distance F between the lateral wall and the liquid fuel duct; more preferably the recession distance R is more than two times the distance F;
- the recession distance R is preferably less than the distance O between the inner surfaces of the lateral wall; however the recession distance R more than half of the distance O;
- the distance F is preferably more than the thickness of the gas fuel duct;
- the distance D between the lateral wall and the gas fuel duct is preferably more than the distance C between the gas fuel duct and the liquid fuel duct;
- the distance D is preferably more than the thickness of the gas fuel duct;
- the distance F is preferably more than the distance I between the inner surfaces of the liquid fuel duct; more preferably the distance F is more than two times the distance I;
- the distance I is preferably more than the distance C.

The invention also refer to a dual fuel injector for a sequential burner of a gas turbine, wherein the dual fuel injector comprises a plurality of dual fuel concentric nozzles as foregoing described.

Moreover, the invention also refer to a sequential gas turbine comprising at least a dual fuel injector provided with a plurality of dual fuel concentric nozzles as foregoing described.

It is to be understood that both the foregoing general description and the following detailed description are exemplary, and are intended to provide further explanation of the invention as claimed. Other advantages and features of the invention will be apparent from the following description, drawings and claims.

The features of the invention believed to be novel are set forth with particularity in the appended claims.

BRIEF DESCRIPTION OF DRAWING

Further benefits and advantages of the present invention will become apparent after a careful reading of the detailed description with appropriate reference to the accompanying drawings.

The invention itself, however, may be best understood by reference to the following detailed description of the invention, which describes an exemplary embodiment of the invention, taken in conjunction with the accompanying drawings, in which.

DETAILED DESCRIPTION OF THE INVENTION

In cooperation with the attached drawings, the technical contents and detailed description of the present invention are described thereinafter according to preferable embodiments, being not used to limit its executing scope. Any equivalent variation and modification made according to appended claims is all covered by the claims claimed by the present invention.

Reference will now be made to the drawing FIGS. 2-7 to describe the present invention in detail.

Figure 2:
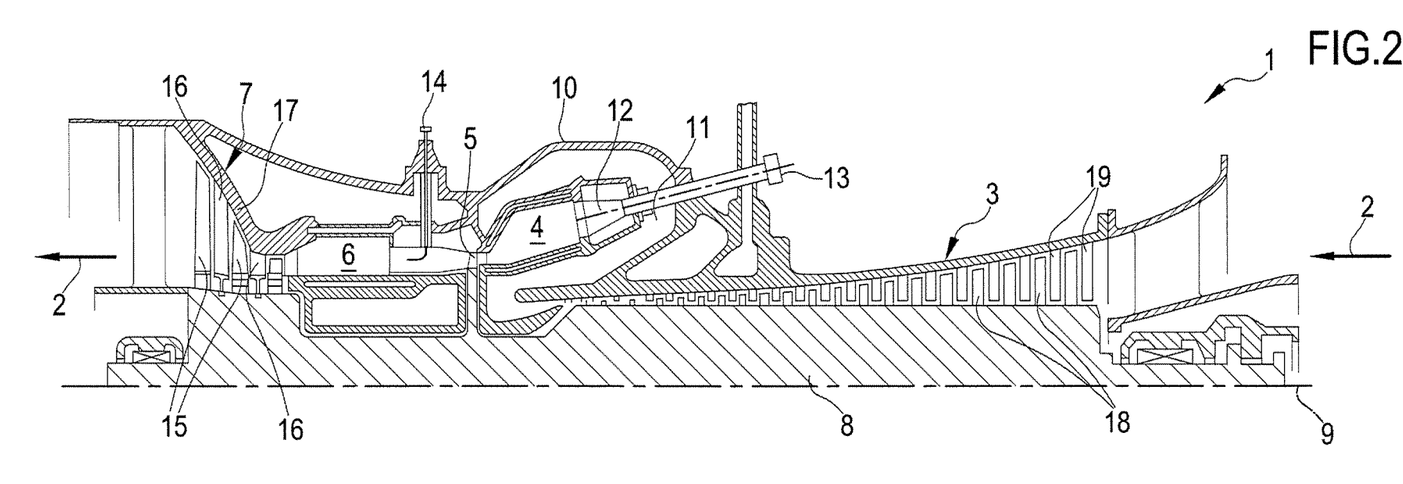
FIGS. 2 and 3 are schematic sectional views of two different examples of sequential gas turbines that can be provided with the dual fuel injector having the concentric nozzle according to the invention.

Reference is now made to FIG. 2 that is a schematic view of a first example of a sequential gas turbine 1 that can be provided with a plurality of dual fuel concentric nozzles according to the invention. In particular, FIG. 2 discloses a sequential gas turbine with a high pressure and a low pressure turbine.

Following the main gas flow 2, the gas turbine 1 comprises a compressor 3, a first combustion chamber 4, a high-pressure turbine 5, a second combustion chamber 6 and a low-pressure turbine 7. The compressor 3 and the two turbines 5, 7 are part of a common rotor 8 rotating around an axis 9 and surrounded by a concentric casing 10.

The compressor 3 is supplied with air and is provided with rotating blades 18 and stator vanes 19 configured for compressing the air entering the compressor 3. The compressed air flows into a plenum 11 and from there into a premix burner 12 where this compressed air is mixed with at least one fuel introduced via a first fuel injector supplied by a first fuel supply 13. The fuel/compressed air mixture flows into the first combustion chamber 4 where this mixture are combusted.

The resulting hot gas leaves the first combustor chamber 4 and is partially expanded in the high-pressure turbine 5 performing work on the rotor 8.

Downstream of the high-pressure turbine 5 the gas partially expanded flows into the second burner where fuel is injected via second fuel injector (not shown) supplied by a fuel lance 14.

The partially expanded gas has a high temperature and contains sufficient oxygen for a further combustion that, based on a self-ignition, takes place in the second combustion chamber 6 arranged downstream the second burner. The reheated gas leaves the second combustion chamber 6 and flows in the low-pressure turbine 7 where is expanded performing work on the rotor 8.

The low-pressure turbine 7 comprises a plurality of stages, or rows, of rotor blades 15 arranged in series in the main flow direction. Such stages of blades 15 are interposed by stages of stator vanes 16. The rotor blades 15 are connected to the rotor 8 whereas the stator vanes 16 are connected to a vane carrier 17 that is a concentric casing surrounding the low-pressure turbine 7.

Figure 3:
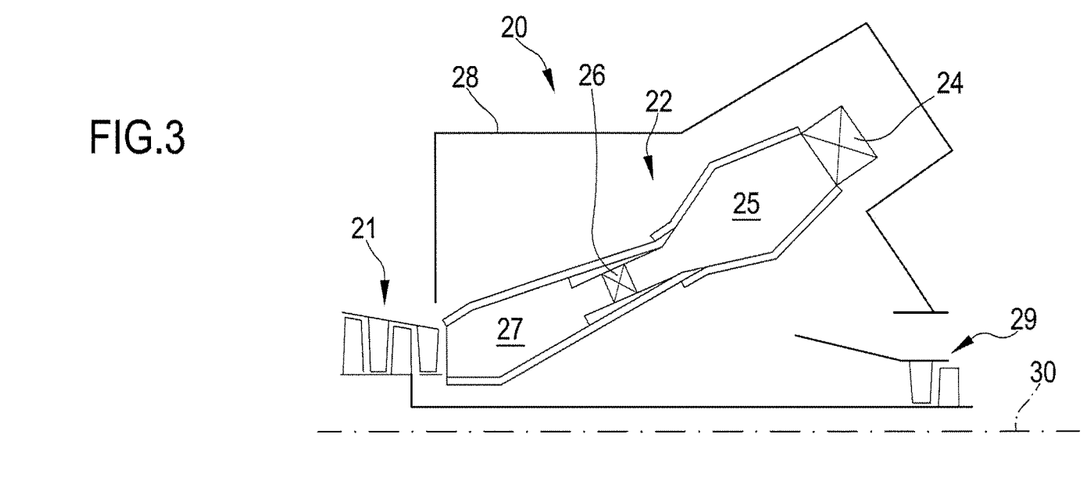

Reference is now made to FIG. 3 that is a schematic view of a second example of a sequential gas turbine 1 that can be provided with a plurality of dual fuel concentric nozzles according to the invention. In particular, FIG. 3 discloses a sequential gas turbine 20 provided with a compressor 29, an only a turbine 21 and a sequential combustor arrangement 22. The sequential combustor arrangement 22 of FIG. 3 comprises a first burner 24, a first combustion chamber 25, a second burner 26, and a second combustion chamber 27. The first burner 24, the first combustion chamber 25, the second burner 26 and the second combustion chamber 27 are arranged sequentially in a fluid flow connection. The sequential combustor arrangement 22 can be annular shaped housed in a combustor casing 28 or can be realized in form of a plurality of cans arranged as a ring around the turbine axis. A first fuel is introduced via a first fuel injector (not shown) into the first burner 24 wherein the fuel is mixed with the compressed gas supplied by the compressor 29. A second fuel is introduced into the second burner 26 via a second fuel injector (not shown) and mixed with hot gas leaving the first combustion chamber 25. The hot gas leaving the second combustion chamber 27 expands in the turbine 21 performing work on a rotor 30.

Figure 4:
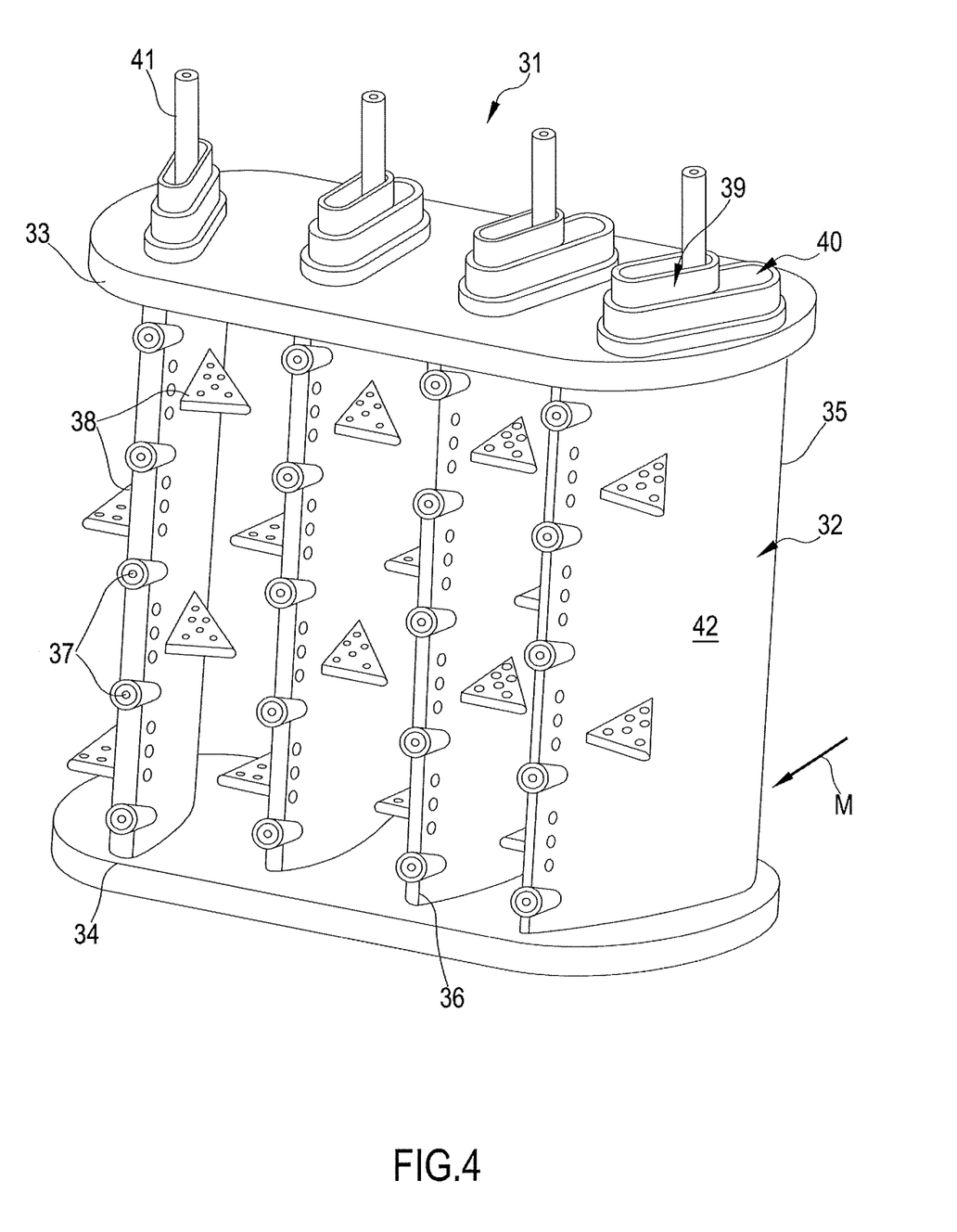
FIG. 4 is a schematic prospective view of a dual fuel injector that can be provided with the concentric nozzle according to the invention.

Reference is now made to FIG. 4 that is an example of a dual fuel injector 31 configured to be used as the second fuel injector foregoing described in the gas turbine of FIGS. 2 and 3.

In particular, FIG. 4 discloses a dual fuel injector 31 comprising four separate fingers 32 extending in parallel between an upper plate 33 and a lower plate 34 delimiting the second burner. Each finger 32 is configured as a streamlined body that has a streamlined cross-sectional profile (like an airfoil). The streamlined body 32 has two lateral surfaces 42 essentially parallel to a hot gas flow M, which passes through the second burner between upper 33 and lower plates 34. The lateral surfaces 42 are joined at their upstream side by a leading edge 35 and joined at their downstream side forming a trailing edge 36.

A plurality of concentric nozzles 37 for injecting a gas and a liquid fuel mixed with air is distributed along the trailing edge 36. Means for improving the mixing quality and reducing pressure loss in said sequential combustor are provided in the trailing edge region of said body in form of a plurality of vortex generators 38 arranged on the streamlined body on both sides at the trailing edge region.

Instead of the vortex generators 38, the trailing edge 36 can be realized in form of lobes running between the nozzles 37 at the trailing edge 36.

The streamlined body 32 comprises a longitudinally, i.e. orthogonal to the gas main flow, extending gas plenum 39 for the distributed introduction of gas fuel into each finger 32. Gas plenum 39 is arranged in the middle between leading edge 35 and trailing edge 36. Moreover, the streamlined body 32 comprises a longitudinally extending air plenum 40, located near to the leading edge 35, and a liquid fuel supply 41, usually oil.

Figure 5:
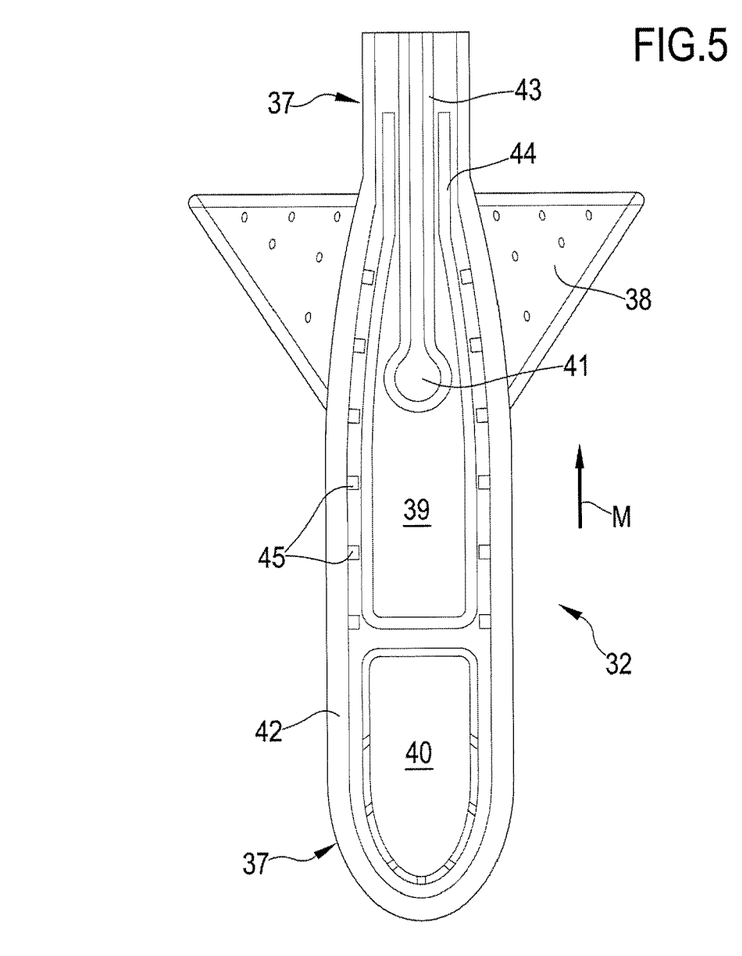
FIG. 5 a schematic section view of an example of a dual fuel concentric nozzle according to the invention.

Reference is now made to FIG. 5 that is a sectional view of a portion of the dual fuel injector of FIG. 4 wherein it is shown an example of a dual fuel concentric nozzle according to the invention.

In particular, FIG. 5 discloses how the gas fuel, the liquid fuel and the carrier air are supplied to the nozzle 37 from the respective gas fuel plenum 39, liquid fuel supply 41 and air plenum 40.

The liquid fuel supply 41 is connected to the downstream end 23 of the nozzle 37 by a liquid fuel duct 43 substantially orthogonal to the liquid fuel supply 41. The liquid fuel therefore flows from the liquid fuel duct 43 to the downstream end of the nozzle 37 passing through a passage defined by the liquid fuel duct 43. The gas plenum 39 is connected to the downstream end of the nozzle 37 by a gas fuel duct 44 arranged concentric and surrounding the liquid fuel duct 43. The gas fuel therefore flows from the gas plenum 39 to the downstream end of the nozzle 37 passing through a passage defined between the outer wall of the liquid fuel duct 43 and the inner wall of the gas fuel duct 44.

The carrier air flows from the air plenum 40 to the downstream end of the nozzle 37 passing through a passage defined between the outer wall of the gas fuel duct 44 and the inner wall of the lateral wall 42 of the streamline body 32. The inner surface of the lateral wall 42 of FIG. 5 is also provided with pins 45 for improving the cooling of the streamline body 32.

Figures 6, 7, 8:
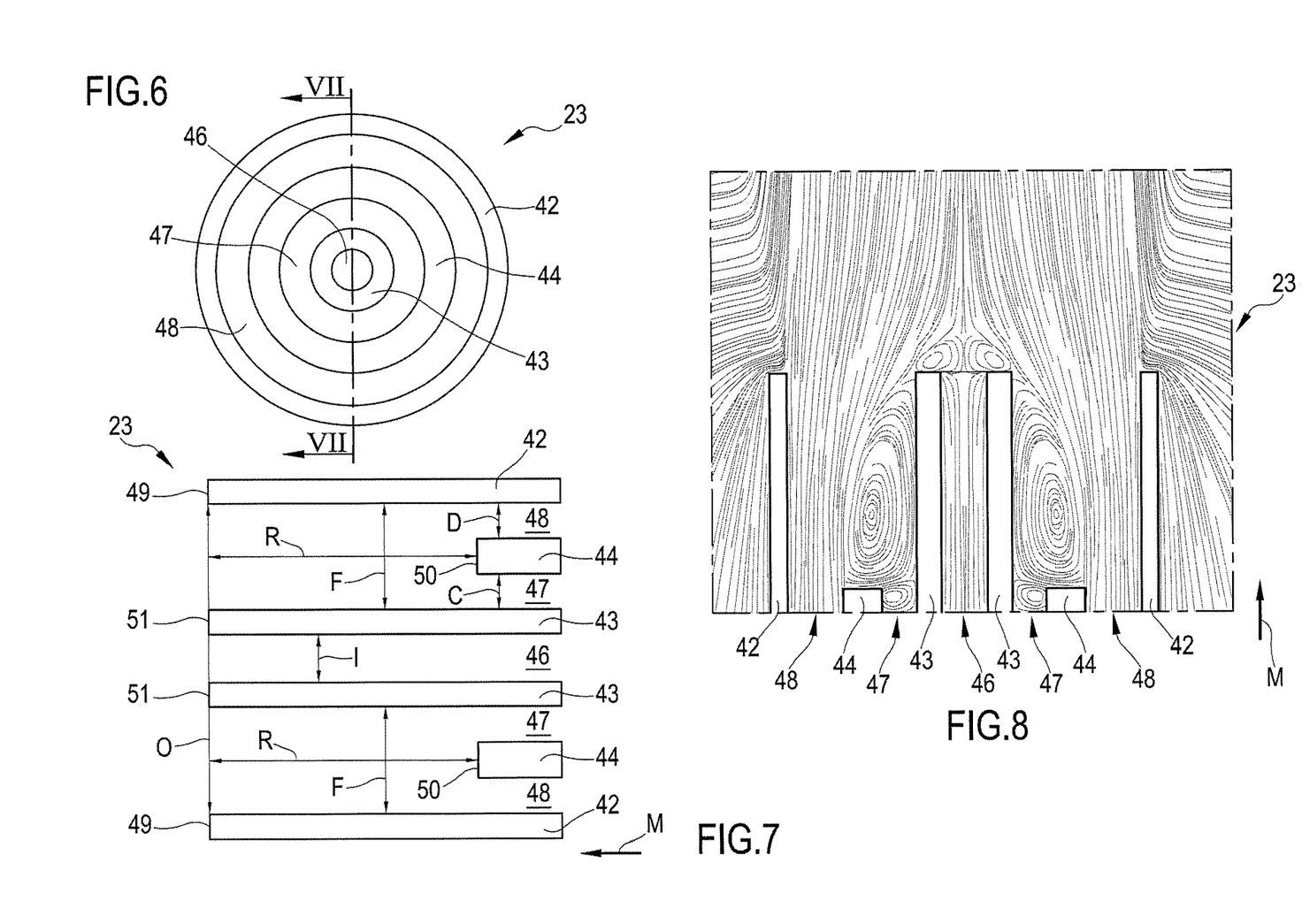
FIGS. 6 and 7 are schematic views of the dual fuel concentric injector of FIG. 5 according to the invention.
FIG. 8 is an enlarged schematic sectional view of the nozzle downstream end of the dual fuel injector of FIG. 7; in particular FIG. 8 discloses the blocking effect performed by the carrier air during liquid (oil) fuel operation in order to avoid the emulsion penetration inside the gas fuel duct.

Reference is now made to FIG. 6 that is a frontal schematic view of the nozzle 37.

In particular, FIG. 6 discloses that the inner liquid fuel duct 43, the outer gas fuel duct 44 and the lateral surface 42 have a circular section at least at the nozzle downstream and 37. Consequently, the liquid fuel passage 46 has a circular section, the gas fuel passage 47 has a ring section concentric and surrounding the liquid fuel passage 46 and the carrier air passage 48 has a ring section concentric and surrounding the gas fuel passage 47.

Reference is now made to FIG. 7 that is a section schematic view of the dual fuel concentric nozzle 37 of FIG. 6 along the section line VII-VII. In particular, FIG. 7 shows the nozzle downstream end edge 49 with respect to the downstream end edge 50 of the gas fuel duct 44 and to the downstream end edge 51 of the liquid fuel duct 43.

The nozzle downstream end edge is defined by the downstream end edge 49 of the lateral wall 42 of the dual fuel concentric nozzle 37. According to the FIG. 7 the downstream end edge 51 of the liquid fuel duct 43 is flush with the nozzle downstream end edge 49 of the lateral wall 42. In this embodiment, the downstream end edge 50 of the gas fuel duct 44 is recessed with respect to the nozzle downstream end edge 49 of the lateral wall 42 and, therefore, also with respect to the downstream end edge 51 of the liquid fuel duct 43. In other words, the downstream end edge 50 of the gas fuel duct 44 is arranged inside the nozzle 37 with a distance R with respect to nozzle downstream end edge. At this recessed portion R, the inner wall of the lateral surface 42 is therefore facing the outer surface of the liquid fuel duct 43. Consequently, between the lateral wall 42 and the liquid fuel duct 43 a free distance F is present.

Reference is now made to FIG. 8 that is a representation of the dual fuel concentric nozzle according to the invention during liquid (oil) fuel operation. In particular, FIG. 8 discloses the blocking effect performed by the carrier air during liquid (oil) fuel operation configured to avoid any emulsion penetration inside the gas fuel duct.

During liquid (oil) fuel operation the gas fuel does not flow through the gas fuel passage 47 whereas the liquid fuel and the carrier air flows respectively through the liquid fuel passage 46 and the carrier air passage 48. In this operating configuration, the recessed downstream end edge 50 of the gas fuel duct 44 allows the generation of an aerodynamic shielding effect that avoids any emulsion penetration inside the gas fuel duct 44. Indeed, in the recessed portion R the carrier air are free to expand in order to fill the entire distance F between the lateral surface 42 and the liquid fuel duct 43. According to FIG. 8, the carrier air generates aerodynamic vortexes that fluidly close the gas fuel passage 47. In particular, the carrier air generates an outer and an inner vortex with respect to gas fuel passage 47 that block the gas fuel passage 47 preventing any emulsion back flow inside the gas fuel duct 44.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A dual fuel concentric nozzle for a gas turbine, comprising:
    a nozzle downstream end configured to inject gas fuel, liquid fuel and carrier air along a hot gas main flow;
    a liquid fuel duct defining a liquid fuel passage for connecting a liquid fuel supply to the nozzle downstream end, the liquid fuel duct having a downstream end edge at the nozzle downstream end;
    a gas fuel duct concentrically surrounding the liquid fuel duct and defining a gas fuel passage between an outer surface of the liquid fuel duct and an inner surface of the gas fuel duct for connecting a gas plenum to the nozzle downstream end, the gas fuel duct having a downstream end edge; and
    at least one lateral wall concentrically surrounding the gas fuel duct and defining a carrier air passage between an outer surface of the gas fuel duct and an inner surface of the at least one lateral wall for connecting an air plenum to the nozzle downstream end, the at least one lateral wall having a downstream end edge at the nozzle downstream end;
    wherein the downstream end edge of the gas fuel duct is recessed inside the nozzle downstream end with respect to the downstream end edge of the liquid fuel duct;
    wherein the downstream end edge of the gas fuel duct is recessed inside the nozzle downstream end with respect to the downstream end edge of the at least one lateral wall and the downstream end edge of the liquid fuel duct is flush with the downstream end edge of the at least one lateral wall such that carrier air passed within the carrier air passage contacts liquid fuel passed within the liquid fuel passage of the nozzle after the liquid fuel and the carrier air pass beyond the downstream end edge of the gas fuel duct recessed within the nozzle downstream end; and wherein the nozzle downstream end is configured so that the carrier air passing through the carrier air passage generates aerodynamic vortexes that fluidly close the gas fuel passage to prevent any emulsion back flow inside the gas fuel duct.

2. The nozzle as claimed in claim 1, wherein the nozzle downstream end is configured so that the carrier air passing through the carrier air passage generates aerodynamic vortexes that fluidly close the gas fuel passage to prevent any emulsion back flow inside the gas fuel duct, the aerodynamic vortexes including an outer vortex and an inner vortex with respect to the gas fuel passage to block the gas fuel passage and prevent any emulsion back flow inside the gas fuel duct; and
    wherein the nozzle downstream end is also configured so that the carrier air passing out of the nozzle downstream end and into the main gas flow provides a shielding effect to limit mixing of the carrier air with gas fuel that exists the gas fuel passage until after the gas fuel and the carrier air exit the nozzle downstream end.

3. The nozzle as claimed in claim 2, wherein a recession distance between the downstream end edge of the gas fuel duct and the downstream end edge of the liquid fuel duct is more than a distance between the at least one lateral wall and the liquid fuel duct.

4. The nozzle as claimed in claim 3, wherein the recession distance between the downstream end edge of the gas fuel duct and the downstream end edge of the liquid fuel duct is more than two times the distance between the at least one lateral wall and the liquid fuel duct.

5. The nozzle as claimed in claim 1, wherein a recession distance between the downstream end edge of the gas fuel duct and the downstream end edge of the liquid fuel duct is less than a width or diameter of a space defined by the inner surface of the at least one lateral wall.

6. The nozzle as claimed in claim 5, wherein the recession distance between the downstream end edge of the gas fuel duct and the downstream end edge of the liquid fuel duct is more than half of a distance of the width or the diameter.

7. The nozzle as claimed in claim 1, wherein a distance between the at least one lateral wall and the liquid fuel duct is more than a thickness of the gas fuel duct.

8. The nozzle as claimed in claim 1, wherein a distance between the at least one lateral wall and the gas fuel duct in more than a distance between the gas fuel duct and the liquid fuel duct.

9. The nozzle as claimed in claim 1, wherein a distance between the at least one lateral wall and the gas fuel duct in more than a thickness of the gas fuel duct.

10. The nozzle as claimed in claim 1, wherein a distance between the at least one lateral wall and the liquid fuel duct is more than a width or a diameter of the liquid fuel duct.

11. The nozzle as claimed in claim 10, wherein the a-distance between the at least one lateral wall and the liquid fuel duct is more than two times a-the width or the diameter of the liquid fuel duct.

12. The nozzle as claimed in claim 1, wherein a distance between an inner surface of the liquid fuel duct is more than a distance between the gas fuel duct and the liquid fuel duct.

13. A dual fuel injector for a sequential burner of a gas turbine, the dual fuel injector comprising:
   a plurality of separate fingers configured for extending inside a burner, each of the fingers having a streamlined body with two lateral surfaces essentially parallel to a flow path for a hot gas main flow, the lateral surfaces being joined at an upstream side by a leading edge and at a downstream side by a trailing edge;
   a plurality of dual fuel concentric nozzles distributed along each trailing edge of the fingers;
   a gas plenum, an air plenum and liquid fuel supply connected to the dual fuel concentric nozzles;
   wherein each of the dual fuel concentric nozzles is a dual fuel concentric nozzle according to claim 1.

14. A sequential gas turbine comprising:
   a rotor;
   a compressor; a first combustion chamber associated to at least a first burner, each first burner having a first fuel injector;
   a second combustion chamber associated to at least a second burner, each second burner having a second fuel injector; and
   at least a turbine;
   wherein the second fuel injector is a dual fuel injector according to claim 13.

15. A dual fuel injector for a sequential burner of a gas turbine, the dual fuel injector comprising:
   a plurality of separate fingers extending inside the burner, each of the fingers having a streamlined body with lateral surfaces essentially parallel to a hot gas main flow, the streamlined body having a leading edge and a trailing edge;
   each of the fingers having a plurality of dual fuel concentric nozzles positioned along the trailing edge;
   a gas plenum connected to the dual fuel concentric nozzles, an air plenum connected to the dual fuel concentric nozzles, and a liquid fuel supply connected to the dual fuel concentric nozzles;
   each of the dual fuel concentric nozzles having a nozzle downstream end configured to inject gas fuel from the gas plenum, liquid fuel from the liquid fuel supply, and carrier gas from the air plenum along the hot gas main flow;
   the nozzle downstream end having:
      a liquid fuel duct defining a liquid fuel passage for connecting the liquid fuel supply to the nozzle downstream end;
      a gas fuel duct concentrically surrounding the liquid fuel duct to define a gas fuel passage between an outer surface of the liquid fuel duct and an inner surface of the gas fuel duct;
      a lateral wall concentrically surrounding the gas fuel duct to define a carrier air passage between an outer surface of the gas fuel duct and an inner surface of the lateral wall;
      a downstream end edge of the gas fuel duct being recessed inside the nozzle downstream end with respect to a downstream end edge of the liquid fuel duct by a first distance, the downstream end edge of the gas fuel duct also being recessed inside the nozzle downstream end with respect to a downstream end edge of the lateral wall by a second distance, and the downstream end edge of the liquid fuel duct being flush with the downstream end edge of the lateral wall such that carrier air passed within the carrier air passage contacts liquid fuel passed within the liquid fuel passage of the nozzle downstream end after the liquid fuel and the carrier air pass beyond the downstream end edge of the gas fuel duct recessed within the nozzle downstream end; and
   the nozzle downstream end configured so that carrier air passing through the carrier air passage generates aerodynamic vortexes that fluidly close the gas fuel passage to prevent any emulsion back flow inside the gas fuel duct.

16. The dual fuel injector for a sequential burner of a gas turbine of claim 15, wherein the first distance is equal to the second distance; and wherein:
   the first distance is more than a distance between the inner surface of the lateral wall and the outer surface of the liquid fuel duct.

17. The dual fuel injector for a sequential burner of a gas turbine of claim 15, wherein the first distance is equal to the second distance; and wherein:
   the first distance is more than a two times a distance between the inner surface of the lateral wall and the outer surface of the liquid fuel duct.

18. The dual fuel injector for a sequential burner of a gas turbine of claim 15, wherein the aerodynamic vortexes include an outer vortex and an inner vortex with respect to the gas fuel passage to block the gas fuel passage and prevent any emulsion back flow inside the gas fuel duct.

19. The dual fuel injector for a sequential burner of a gas turbine of claim 18, wherein the the nozzle downstream end is also configured so that the carrier air passing out of the nozzle downstream end and into the main gas flow provides a shielding effect to limit mixing of the carrier air with gas fuel that exists the gas fuel passage until after the gas fuel and the carrier air exit the nozzle downstream end.

* * * * *